United States Patent [19]

Dröge

[11] Patent Number: 5,729,105
[45] Date of Patent: Mar. 17, 1998

[54] MOISTURE ACTUATED DEVICE FOR AUTOMATIC CONTROL OF A WINDSCREEN WIPER MOTOR

[75] Inventor: Bernhard Dröge, Neuberg, Germany

[73] Assignee: Etablissement Voralp, Schaan, Liechtenstein

[21] Appl. No.: 624,594

[22] PCT Filed: Sep. 27, 1994

[86] PCT No.: PCT/DE94/01134

§ 371 Date: Apr. 4, 1996

§ 102(e) Date: Apr. 4, 1996

[87] PCT Pub. No.: WO95/10434

PCT Pub. Date: Apr. 20, 1995

[30] Foreign Application Priority Data

Oct. 8, 1993 [DE] Germany ................ 43 34 381.3

[51] Int. Cl.[6] ........................................... H02P 7/00
[52] U.S. Cl. .................................. 318/483; 318/DIG. 2; 318/443; 15/DIG. 15; 307/10.1
[58] Field of Search ........................... 318/483, 443, 318/444, DIG. 2, 220, 221, 223, 285, 286; 15/250.13, 250.12, 250 C; 307/10.1

[56] References Cited

U.S. PATENT DOCUMENTS

| | | |
|---|---|---|
| 4,495,452 | 1/1985 | Boegh-Paterson . |
| 4,867,561 | 9/1989 | Fuji et al. . |
| 4,916,374 | 4/1990 | Schierbeek et al. . |
| 5,057,754 | 10/1991 | Bell .......................... 318/483 |
| 5,059,877 | 10/1991 | Teder ........................ 318/444 |
| 5,216,341 | 6/1993 | Nomura et al. ............. 318/444 |
| 5,319,293 | 6/1994 | Levers ....................... 318/483 |
| 5,508,595 | 4/1996 | Schaefer ................. 318/DIG. 2 |
| 5,568,027 | 10/1996 | Teder ........................ 318/483 |
| 5,600,254 | 2/1997 | Berberich ............... 318/DIG. 2 |

FOREIGN PATENT DOCUMENTS

| | | | |
|---|---|---|---|
| 0443080A1 | 8/1991 | European Pat. Off. | B60S 1/08 |
| 0547337A1 | 6/1993 | European Pat. Off. | B60S 1/08 |
| 0549010A1 | 6/1993 | European Pat. Off. | B60S 1/08 |
| 2630470 | 1/1978 | Germany | B60S 1/08 |
| 3314770 | 11/1987 | Germany | B60S 1/08 |
| 3722510A1 | 1/1989 | Germany | B60S 1/08 |
| 4217391 | 12/1993 | Germany | B60S 1/08 |
| WO9008680 | 8/1990 | WIPO | B60S 1/04 |

*Primary Examiner*—Jonathan Wysocki
*Attorney, Agent, or Firm*—Koda and Androlia

[57] ABSTRACT

The invention relates to a device for the automatic control of a windscreen wiper motor. The device has a moisture sensor which emits a signal depending on the moisture on the windscreen or another point on a motor vehicle so that this signal to some extent produces an analog reflection of the moisture varying in time. The output signal of the sensor is evaluated in such a way that it is continuously compared with a threshold value which can be altered. Every time this threshold value is reached or exceeded by a pulse-like change in the sensor output signal, this event is counted. After a given number Z of such events the windscreen wiper motor is switched on.

8 Claims, 5 Drawing Sheets

MOISTURE ACTUATED DEVICE FOR AUTOMATIC CONTROL OF A WINDSCREEN WIPER MOTOR

SPECIFICATION

The invention relates to a device according to the Preamble of Patent claim 1.

In order to maintain good visibility of the driving lane while driving in rain it has been customary for a long time to provide windshield wipers which, at least for a given length of time, clear the windshield. These windshield wipers are activated through a manually actuatable windshield wiper switch or lever, where some times three switch positions are provided: one for slow wiping, one for fast wiping and one for intermittent wiping. In addition, a wipe-wash switching mechanism can be provided, upon the actuation of which water is sprayed from a container onto the windshield in order to clean it.

Since, in particular under rapidly changing weather conditions, the manual actuation of the windshield wiper is tiresome, windshield wiper controls have previously been suggested which comprise a sensor which detects the moisture on the windshield and automatically drives the windshield wiper as a function of the moisture.

In the simplest form of the automatic windshield wiper only the occurrence of moisture on the windshield is detected and, subsequently, the windshield wiper actuated. However, this has the disadvantage that in the presence of extremely low moisture which is not perceptible to the driver, the windshield wiper is already activated. In order to remedy this disadvantage, it is possible to define a moisture threshold value and the windshield wiper is only activated when this value is exceeded.

Such windshield wiper control, however, has the disadvantage that the wiping is continued even after it has stopped raining because under these conditions the set threshold value can still be exceeded. Consequently, the windshield wiper would be switched off too late and would continue wiping a dry windshield.

In order to be able to differentiate between rain proper and mere water streaks, it has already been suggested to provide, in addition to said threshold value switch, an arrangement which detects whether or not the moisture increases or decreases (DE-A-37 22 510). Only when both conditions are present—the given moisture threshold is exceeded and the moisture increases—is the windshield wiper activated. Of disadvantage in this arrangement is that it already triggers the windshield wiper motor following extremely small moisture increases on the windshield.

So that the windshield wiper is not actuated after every insignificant moisture increase, it has been suggested to carry out the triggering if the magnitude of the moisture increase exceeds a given value (WO 90/08680).

In another known arrangement a sensor is used which differentiates the water drops impinging on the windshield according to their size (EP-A-0 549 010). This sensor comprises two electrodes between which gaps are disposed which change with respect to size. Hereby large gaps are only bridged by large drops.

Furthermore is known an optical rain sensor for a windshield wiper control which comprises several light transmitters and receivers and the light signals received by a light receiver are compared with a reference level. If the reference level is exceeded, the sensor outputs a signal. On the basis of the count of rises above the level conclusions are drawn about the conditions on the outside of the windshield (U.S. Pat. No. 4,867,561). Of disadvantage is here that approximately 15 light transmitters and receivers must be used.

In the not previously published German Patent Application (unexamined) 42 17 391, furthermore, a device for the automatic control of a windshield wiper motor is suggested, which is equipped with a moisture sensor which outputs a signal as a function of the moisture (DE-A-4 217 391). This device also comprises an evaluation device which evaluates the signal of the moisture sensor with the sensor output signal varying over time. Moreover, a circuit configuration is provided which is provided with a switch-on threshold dependent on the sensor signal.

Lastly, an automatic control of motor vehicle windshield wiper systems is known in which a capacitive moisture sensor is provided and in which for the signal evaluation a pulse amplifier is used (DE-A-2 630 470). This pulse amplifier filters out the transient behaviour of a DC or AC current caused by rain drops and amplifies it. In addition, a counter is provided in the known control, which, every time the windshield wiper motor has been triggered, is reset to zero. However, counting the number of times a threshold value curve is exceeded by a curve generated by the measuring sensor does not take place.

SUMMARY OF THE INVENTION

The invention is based on the task of evaluating the output signal of only one moisture sensor in such a way that various conditions of moisture on a windshield can be differentiated.

The advantage achieved with the invention resides in particular therein that through the mere counting of events on the windshield which lead to a moisture change, a conclusion can be drawn regarding various moisture conditions. The windshield wiper motor is activated in accordance with these moisture conditions.

BRIEF DESCRIPTION OF THE DRAWINGS

In the following the invention will be explained in conjunction with the drawings. Therein depict.

DETAILED DESCRIPTION OF THE INVENTION

Figure 1:
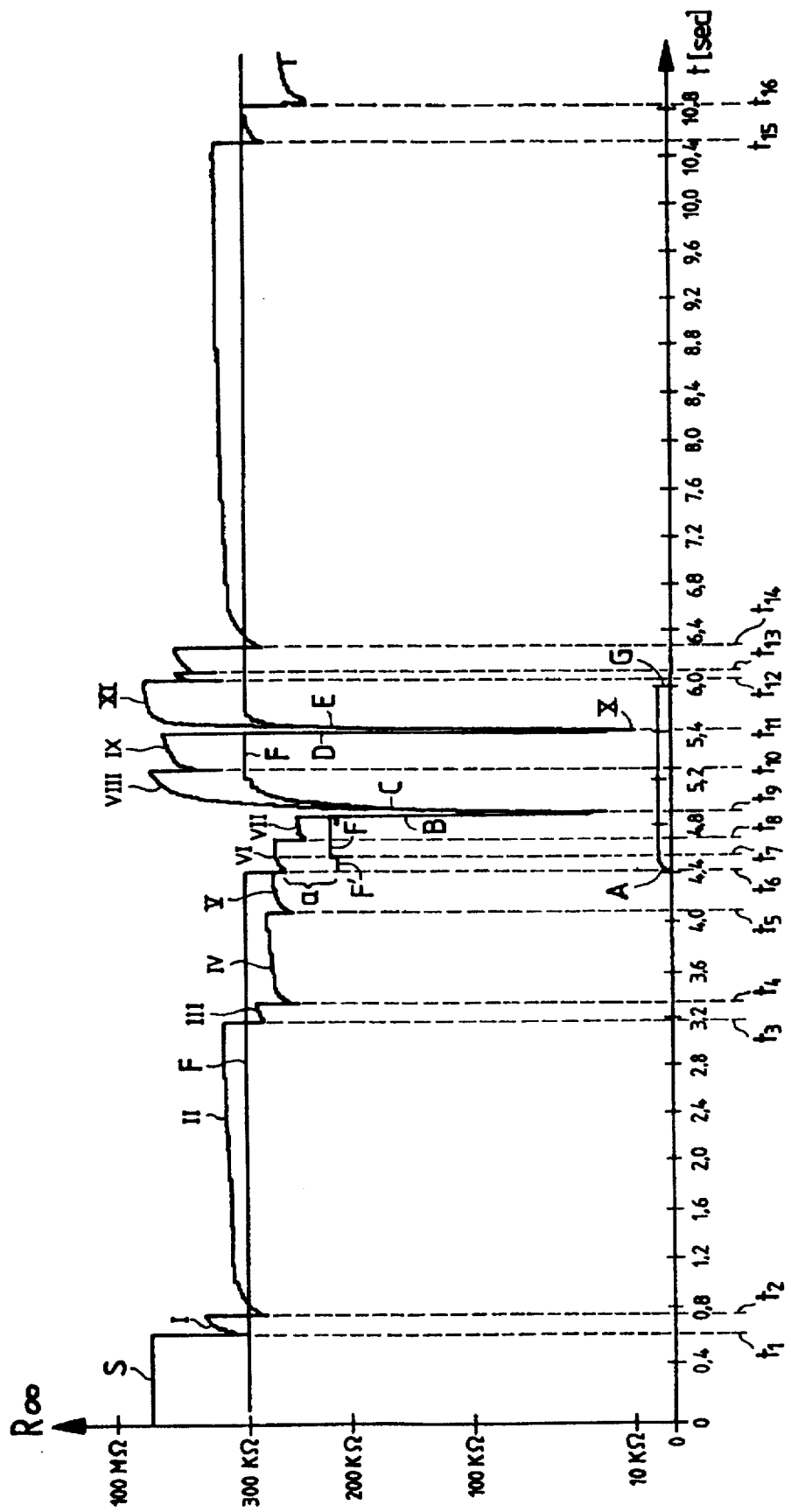
FIG. 1 the output signal of a moisture sensor with a function value signal associated with this output signal with several pulse-form changes with intermediate amplitude being present in the output signal.
Figure 3:
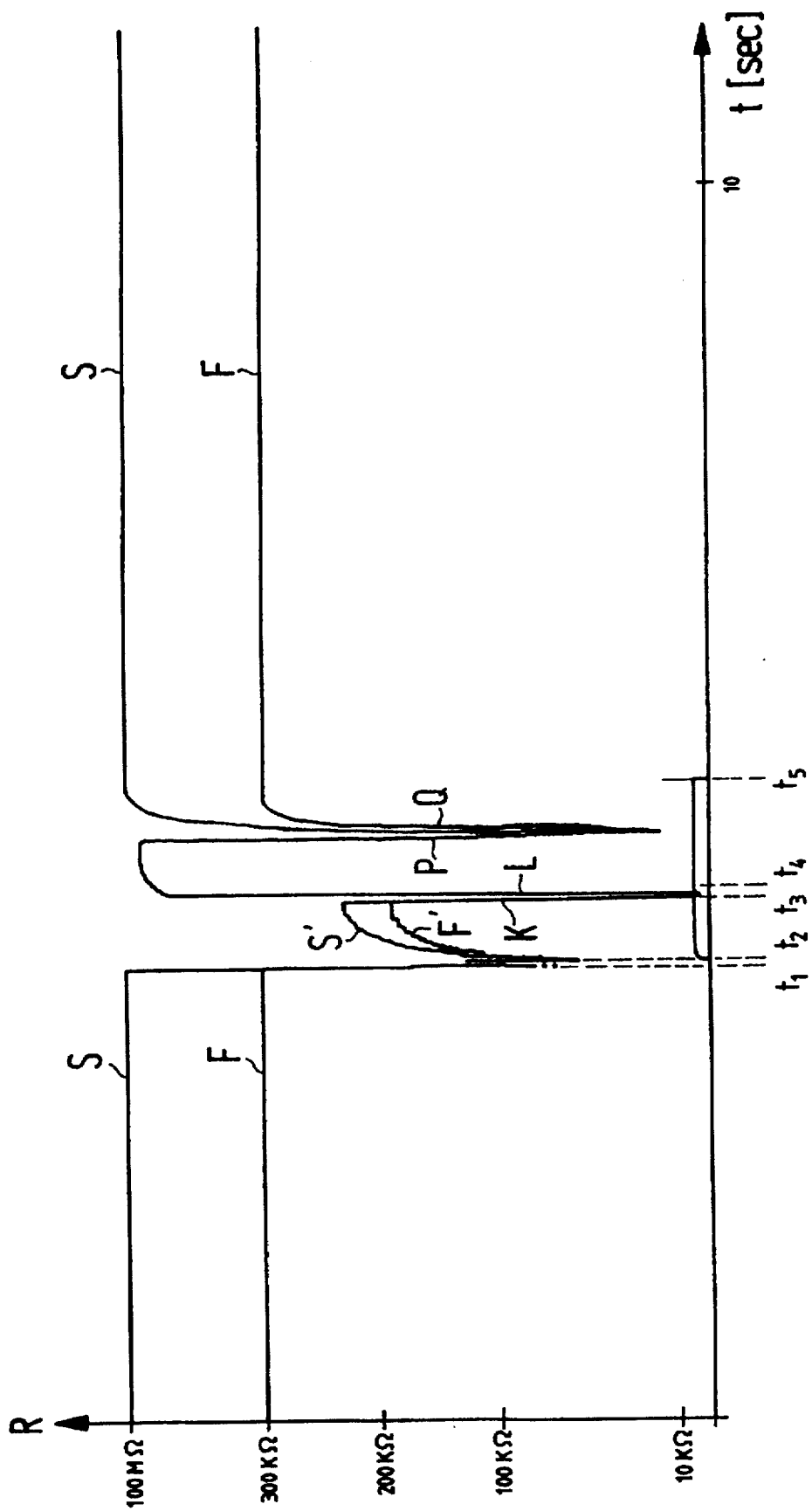
FIG. 3 a sensor output signal with an associated function value signal with two pulse-form changes with large amplitude occurring in close succession in the sensor output signal.

In FIG. 1 the output signal 1 of a moisture sensor 2 is depicted, which changes as a function of the moisture present on the outside of a windshield 4. As is shown in FIG. 3 of WO 90/08680, i.e. comprising one ohmic resistor, this moisture sensor 2 can be implemented, for example, such that it is disposed on the outside of a windshield 4 and changes as a function of the moisture present. At least one wiper blade sweeps over this sensor. However, it is also possible to implement this sensor 2 optically, capacitively or in other ways.

The Figures described in the following, in contrast, refer to an ohmic resistance which can vary in the range from 0 to ∞ Ohms. The resistance range occurring in practice extends from approximately 10 kΩ to 100 MΩ, which is indicated on the nonlinear ordinate of FIG. 1. The time period considered in FIG. 1 is approximately 10 seconds. Similar representations would result if, instead of the resistance, the conductance were plotted on the ordinate. The terms 'rise above' and 'fall-off below' the threshold value, used in the following, are therefore only uniquely determined in connection with the particular seconds considered. The ordinate on which the resistance is plotted is not linear but rather quasi-logarithmic.

The amplitude of the output signal S is sampled cyclically, for example at a clock frequency of 10 kHz.

Below the output signal S is shown a function value curve F which represents a threshold value curve. In general, this threshold value curve is a straight line extending parallel to the abscissa. However, it can be changed so that this is basically a variable threshold value curve which can be generated with concrete switching means (WO 90/08680) or by means of programmed computers. The particular applicable threshold value adapts to the maximum value occurring with the output signal 1.

In the example of FIG. 1, the criterion for triggering the windshield wiper motor is the count of the moisture events on the windshield 4 which exceed a particular threshold value. This count can be freely determined by an evaluation device 10. According to the example of FIG. 1, six events are required in order to activate the windshield 4 wiper motor 8.

During the first 0.6 seconds under consideration the sensor 2 output signal S is approximately constant, i.e. no moisture event occurs on the windshield 4. At time $t_1$, for example, a rain drop or an insect impinges on the sensor 2 and causes the ohmic resistance to fall suddenly by a given magnitude. The resistance thus changes not only generally but rather by a given magnitude. This magnitude of change is so great that a fall-off below the function value curve F occurs. To utilize a magnitude of change as the decisive criterion is already known from the cited WO 90/08680.

Since the output signal S is continuously sampled and compared with the variable threshold value F by the evaluation device 10, the deviation of the threshold value F is detected and stored. Although the magnitude of change of moisture has reached the value required for switching on the windshield wiper 6, this action is nevertheless not intended since this could be an isolated event and switching on the wiping process might not be worthwhile. Through the air stream during driving, the heat or other influencing parameters the moisture evaporates again, which is expressed by the curve segment I.

At time $t_2$ a moisture increase occurs again which is manifested by a lowering of the output signal S. This time a fall-off below the function threshold value F occurs also. But still no triggering of the windshield wiper motor 8 occurs because two events also do not appear sufficient to actuate the windshield wiper 6. However, the fact that two events have occurred within a given time is stored in memory. Until the next succeeding time $t_3$ no further event occurs so that the moisture present at time $t_2$ gradually evaporates which is shown by the curve segment II. Curve segment II is not entirely smooth because during time $t_{3-2}$ extremely small moisture changes occur. At time $t_3$ for example a further rain drop falls on the sensor 2 which is so large that the amplitude of the resistance change falls again below threshold value F. Until this point this threshold value F has remained constant because it is only changed if the amplitude of the sensor signal S has a new maximum value compared to an earlier maximum value which had determined the threshold value F.

The third moisture, and thus resistance change falling below the threshold value F, however, should also not lead to the triggering of the wiper 6. Therefore evaporation of the moisture, and thus a resistance increase, takes place again, which is represented by curve segment III. But after a short time, at time $t_4$, again a lowering of the resistance takes place, this lowering occurring to a point below the threshold value F. But triggering the windshield wiper 6 still does not take place but rather it is registered that in the meantime four moisture events have taken place which all extended below the threshold value F.

After a further evaporation phase, characterized by curve segment IV, at time $t_5$ a further moisture event occurs. This event is also below threshold F but does not lead to triggering of the windshield wiper 6 but to evaporation expressed by curve segment V.

Only after at time $t_6$ the sixth event below threshold F has taken place is the windshield wiper triggered, which is marked by the leading edge A.

The windshield wiper 6 which, in the present case, is a one-arm windshield wiper, now starts wiping. At the beginning of the wiping process the memory which had counted and stored the previous events, is erased. Simultaneously a new function threshold value F is calculated. The interval a between curve V and the new threshold value F is determined by a given formula which, however, allows adjustable parameters, i.e. the interval a is adjustable according to the particular requirements or needs. Thus, it is also possible to accommodate individual wishes and to set the automatic windshield wiper system so that it is "sensitive" or "less sensitive".

At time $t_7$ a further event occurs, but this time it is above the new threshold value. With respect to wiper activity, however, it is not acknowledged. However, the sensor value S represents a new maximum after the new setting of the threshold value to F' so that again a new threshold value F" is calculated. The further event occurring at time $t_8$ is above this new threshold value and neither is the windshield wiper influenced by it nor is a new threshold value calculated.

By sweeping over the sensor with the moist wiper blade the resistance initially decreases dramatically which is characterized by edge B. However, after the wiper in its forward path has swept over the sensor, the resistance again increases rapidly which is characterized by edge C. The output signal S increases until time $t_{10}$ which is expressed by curve segment VIII. Since the maximum value of this curve segment VIII is again above the max/mum value of curve segment VII, a new threshold value F is calculated which, in the present case, is identical with the original threshold value. The further moisture event at time $t_{10}$ does not cause a new setting of the threshold value F since the maximum of the curve segment IX is below the maximum of curve segment VIII. The event is also not counted since the wiper blade on its return has not reached the sensor 2. This occurs only at time $t_{11}$. The beginning of the sweep over the sensor 2 on the return path of the wiper blade is characterized by edge D. The edge denoted by E, in contrast, characterizes the moisture condition when the wiper blade leaves the sensor.

After edge E has occurred, the arrangement again starts counting events. The end of the wiping process is characterized by edge G. The time segment between edge G and A, as a rule, is determined by the particular windshield wiper installed in the motor vehicle. Since the arrangement according to the invention is to be also applicable in cases where windshield wipers of various types are already installed, the particular time segment A–G is irrelevant. Rather, the significant information is obtained from edges D or E with the slope in the curve segment X potentially being determined in addition. After a particular time a high resistance value occurs again, which is characterized by curve segment XI. With the threshold value F increases to its previous level. The new event occurring at time $t_2$ remains insignificant because it does not reach threshold value F. The same applies to the event at time $t_{13}$. Only the event at time $t_{14}$ is counted again since it falls below the threshold value. However, it does not trigger a motion of the windshield wiper 6 since in order for this to occur five further events must occur which are all below the function value F. However, such events can only occur at times $t_{15}$ and $t_{16}$.

Figure 2:
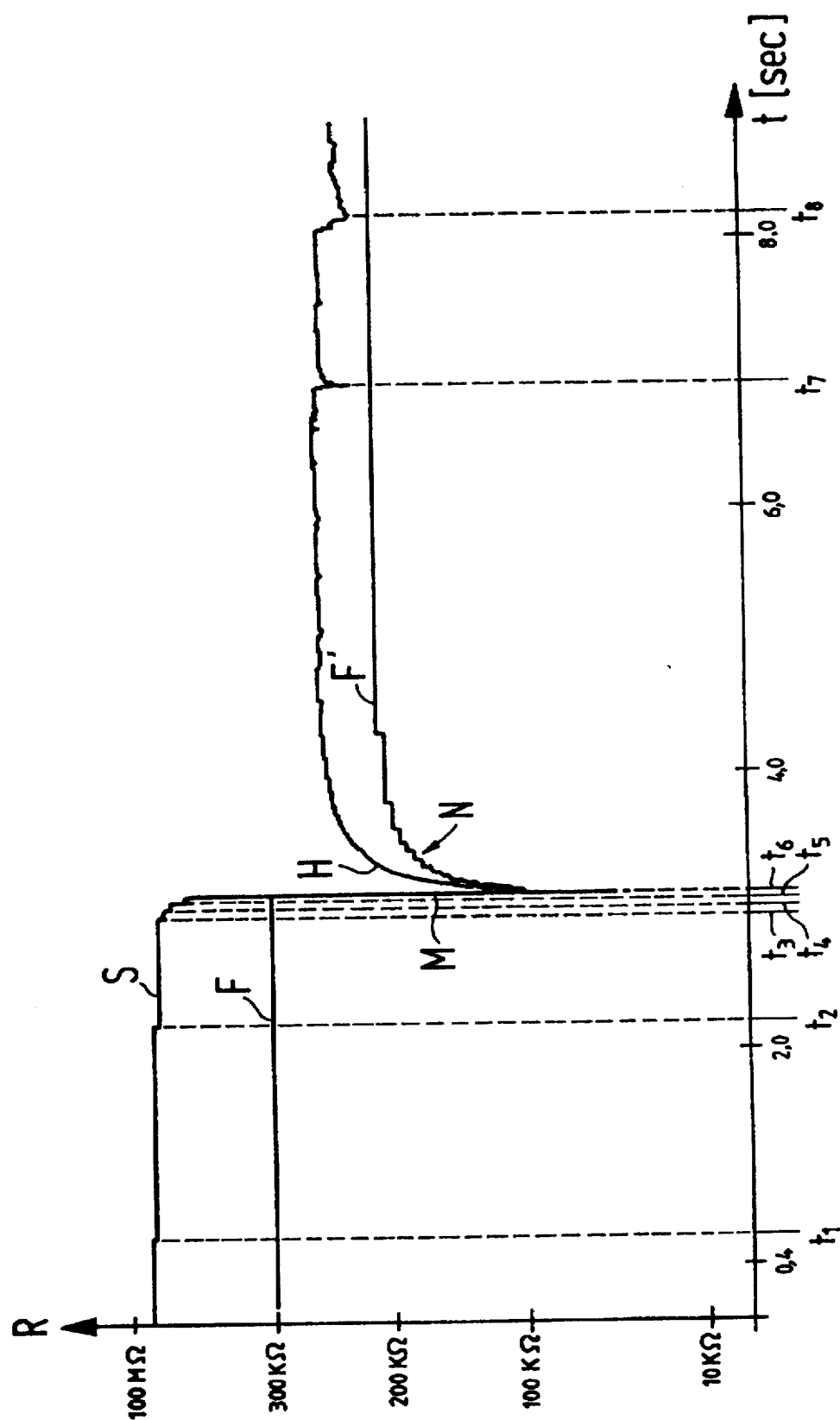
FIG. 2 an output signal and a function value signal corresponding to FIG. 1, however, with a pulse-form change with large amplitude being present in the output signal.

While in FIG. 1 several moisture events of approximately the same type occur sequentially, such as is the case under conditions of "normal" rain, FIG. 2 shows the change of a sensor 2 output signal S upon impingement of a single and thick drop or insect on the sensor, which event is not intended to trigger activity of the windshield wiper 6. Although thus a relatively large moisture increase occurs, the windshield wiper is not to be actuated. At times $t_1$ and $t_2$ small events occur which cause minimal change of the signal curve S. Since they do not fall below the function threshold value they are neither counted nor are they cause for any other event. The same applies to the small events at times $t_3$, $t_4$, $t_5$. Only at time $t_6$ does an event occur causing a considerable reduction of the resistance. This isolated event is nevertheless not intended to trigger the windshield wiper since this event can be, for example, a bug hitting the sensor, with the bug subsequently falling off the windshield again.

In the case depicted, the resistance again increases after it had rapidly fallen, which is characterized by edge H. The low decrease of the resistance according to edge M does not cause triggering of the windshield wiper, but causes a new determination of the function value threshold. In curve segment N of the function value F' the curve has the form of a staircase resulting on the basis of the digital extrapolation of the new threshold value.

The events at times $t_7$ and $t_8$ are without consequence since they do not fall below the new threshold F'. They also do not form a new threshold value since they do not contain any new maxima.

If an event as large as that shown in FIG. 2 occurs after time $t_6$, the further shape of curve S is observed. If the low resistance had existed for a relatively long time, wiping would take place. In other words: after a marked downward change of the curve, the curve is monitored for a given length of time, for example, for 10 ms. If within this time no drying occurs, wiping takes place.

FIG. 3 depicts curve profiles largely corresponding to the curve profile in FIG. 2. However, in contrast to FIG. 2, the windshield wiper 6 is actuated. As can be seen in FIG. 3, at time $t_1$ a large event occurs. This large event is followed already at time $t_2$ by a further large event. Hereupon, the windshield wiper 6 is immediately activated, i.e. no extrapolation takes place initially until six events have occurred, but switching already takes place after two events. The count Z of moisture events leading to triggering of the windshield wiper 6, consequently, is here itself a function of the magnitude of the moisture change. The function value F is newly determined resulting in function value F'. By edges K and L at times $t_3$ and $t_4$ the resistance changes are denoted which are obtained when the wiper blade in its forward path sweeps over the sensor.

Sweeping over the sensor 2 by the wiper 6 blade on the return path is characterized by edges P and Q. At the completion, both S and F are again at their previous level.

Activation of the windshield wiper 6 takes place between $t_5$ and $t_2$.

Figure 4:
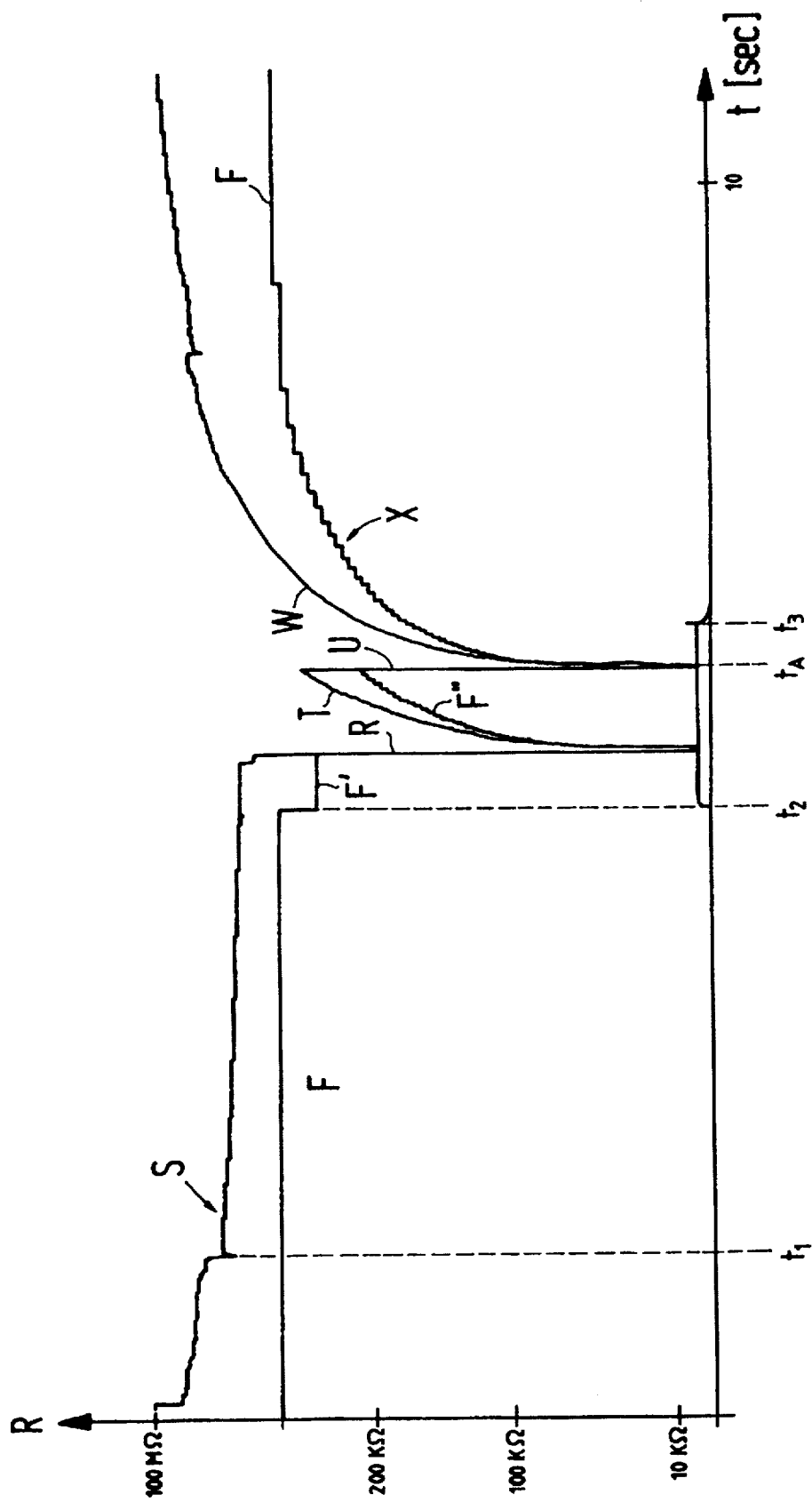
FIG. 4 a sensor output signal with associated function value signal with the sensor output signal continuously in the neighbourhood of the function value signal.
Figure 5:
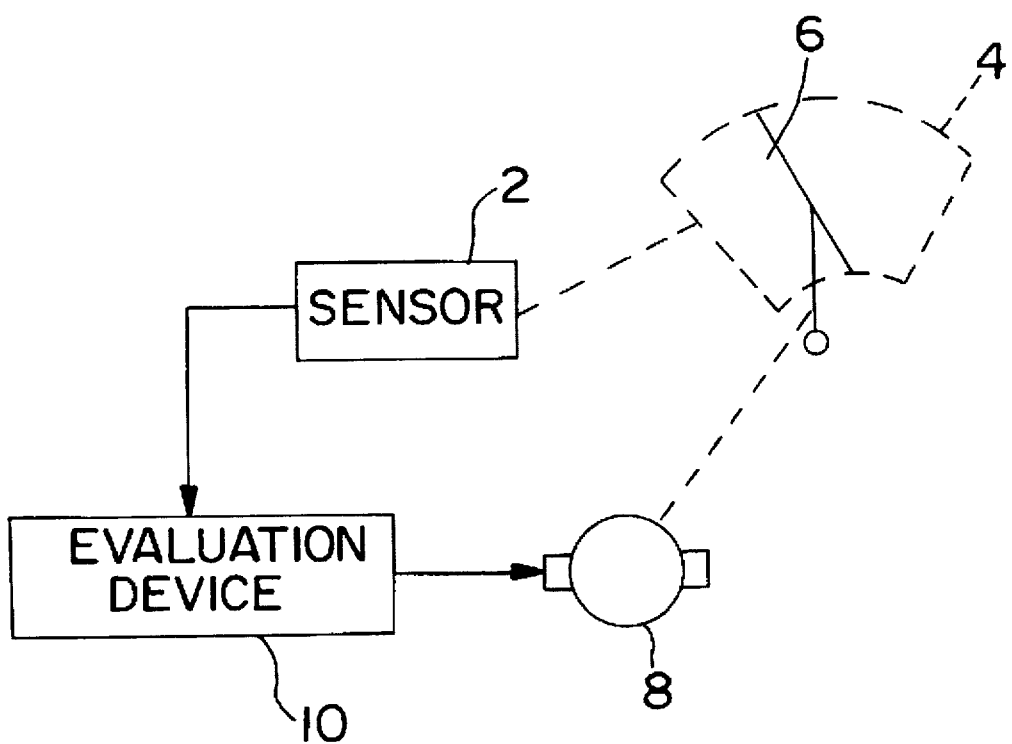
FIG. 5 is a simplified block diagram of the device of the present invention.

In FIG. 4 the curve profiles are depicted which result, for example, under conditions of fog when only very small water droplets impinge on the sensor 2. These small drops of water generate no fall-offs in the signal curve extending below the threshold value curve.

It can be seen that the output signal of the sensor 2 until time $t_1$ is gradually decreased due to very small events. Initially this decrease does not lead to any change. At time $t_1$, however, a somewhat greater event occurs which would normally not be counted since it does not yet fall below threshold F. Nevertheless, this event is counted in the present case, i.e. beginning at time $t_1$ the curve S is monitored. The monitoring comprises that the sampled values of curves S are compared with value F. If a decreasing tendency of this amplitude over a given length of time is detected, the wiper is switched on at time $t_2$ even though the value S had not decreased below F.

When the windshield wiper is switched on at time $t_2$ the function value F is simultaneously decreased to a value F'. Curve R denotes the sensor output signal when the wiper on its forward path contacts the sensor. By curve T the signal is denoted at the point the wiper 6 on its forward path has again left the sensor 2. The function threshold value F" is adapted to curve T. If the wiper contacts the sensor 2 on its return path, the resistance again decreases rapidly which is denoted by edge U. When the wiper blade on its forward path leaves the sensor again; the resistance curve increases which is denoted by the curve segment W. With the increase of the resistance curve the function curve is also extrapolated, which is represented by curve segment X. The windshield wiper 6 is here switched on between $t_3$ and $t_3$ and $t_2$.

Curve segment X has the form of a staircase resulting from the fact that each new maximum value of W requires a digital recalculation of the function value F.

FIGS. 1, 3, and 4 which depict curves measured during actual operation, show that the resistance decreases dramatically when the sensor 2 is contacted by the wiper blade. After a wiper blade in a wiping process had last contact with the measuring field, differing resistance values between zero and infinity result as a function of residual moisture, dirt, the condition of the windshield 4 and of the wiper blade. The trace of the output signal is therefore highly nonuniform and can also briefly decrease in the absence of new moisture from the outside. This can make useless an arrangement which only responds if the measured moisture increases. In order to eliminate this error source, all conditions over the sensor 2 are suppressed which are between the triggering of a wiping command and—within a wiping cycle—of the last contact with the measuring field by the wiper blade. According to FIG. 4, evaluation of the signal S is therefore only started again at time $t_1$.

The invention can be realized with the aid of discrete switching elements or with the aid of programmed computers. Since the discrete switching means for realizing the invention are known, they do not need to be described in further detail.

Specifications of flowcharts are also superfluous since the way in which the flowcharts need to be layed out in order to realize the above described characteristics of the invention are known to the person skilled in the art.

It is understood that the invention described in connection with a windshield wiper control can also be applied for other purposes, for example for opening and closing sliding roofs.

It is also insignificant whether or not the sensor signal represents the change of a resistance, a capacitance or a light reflection coefficient. What is significant is that between the sensor signal and the moisture on the windshield a functional relationship exists.

I claim:

1. A device for the automatic control of a windshield wiper motor, having
   a) a moisture sensor which, in dependence on the moisture, emits a signal (S);
   b) an evaluating device which evaluates the signal (S), changing over time, from the moisture sensor;
   c) a signal source which, in dependence on the changing signal (S) from the moisture sensor, emits a threshold function curve (F), the threshold function curve (F) only being changed once the signal (S) from the moisture sensor has a new extreme value; characterized in that
   d) all the changes in the signal (S) which reach or exceed a predetermined amount once the signal (S) from the moisture sensor exceeds or has exceeded the threshold function curve (F) are counted; and
   e) once these changes in the signal (S) are equal to a predetermined number (Z), the windshield wiper motor is activated.

2. The device as stated in claim 1, characterized in that the threshold value function curve (F) is substantially a straight line parallel to the abscissa, whose amplitude is only changed if the signal (S) assumes a new maximum value exceeding an earlier maximum value.

3. Device as stated in claim 1, characterized in that during the wiping process the number of changes of the signal (S) are not counted and an evaluation of this signal (S) occurs again only when the wiper blade has left the sensor again.

4. Device as stated in claim 1, characterized in that when the threshold value function curve (F) has been exceeded a predetermined number of times by the number of changes of the signal (S), the threshold value function curve (F) in newly determined in relation to the amplitude of the signal (S) at the point in time the windshield wiper motor is switched on.

5. Device at stated in claim 4, characterized in that an increase (VI) in the amplitude of the signal (S) during the wiping process brings about an adaptation of the threshold value function curve (F).

6. Device as stated in claim 1, characterized in that once the amplitude of the signal (S) falls substantially below the current threshold value function curve (F), a threshold value function curve (F) is determined even if the predetermined number (Z) has not been reached.

7. Device at stated in claim 1, characterized in that once the amplitude of the signal (S) falls substantially below the current threshold value function curve (F) and when a further amplitude of the signal (S) which falls substantially below the current threshold value function curve (F) within a succeeding brief time, the windshield wiper motor is actuated.

8. Device for the automatic control of a windscreen wiper motor comprising
   a) a moisture sensor which outputs a signal (S) as a function of the moisture;
   b) an evaluation device which evaluates the signal (S) changing over time of the moisture sensor;
   characterized in that
   c) a threshold value function curve (F) is determined as a function of the signal (S);
   d) the amplitude of the signal (S) within a predetermined time is compared with the associated amplitude values of the threshold function curve; and
   e) at a predetermined number of successive comparisons in which the interval between signal (S) and function curve (F) becomes continuously smaller, the windshield wiper motor is activated.

* * * * *